US011228969B2

United States Patent
Tang

(10) Patent No.: US 11,228,969 B2
(45) Date of Patent: Jan. 18, 2022

(54) METHOD FOR ACCESSING WIRELESS LOCAL AREA NETWORK, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/764,227

(22) PCT Filed: Nov. 24, 2017

(86) PCT No.: PCT/CN2017/112942
§ 371 (c)(1),
(2) Date: May 14, 2020

(87) PCT Pub. No.: WO2019/100341
PCT Pub. Date: May 31, 2019

(65) Prior Publication Data
US 2020/0280907 A1    Sep. 3, 2020

(51) Int. Cl.
*H04W 76/11*    (2018.01)
*H04W 48/16*    (2009.01)
*H04B 17/318*   (2015.01)
*H04W 76/27*    (2018.01)
*H04W 48/06*    (2009.01)
(Continued)

(52) U.S. Cl.
CPC .......... *H04W 48/16* (2013.01); *H04B 17/318* (2015.01); *H04W 48/06* (2013.01);
(Continued)

(58) Field of Classification Search
CPC ..... H04W 48/16; H04W 76/11; H04W 76/27; H04W 48/06; H04W 72/046;
(Continued)

(56) References Cited

U.S. PATENT DOCUMENTS

2013/0242783 A1   9/2013  Horn et al.
2014/0161103 A1*  6/2014  Sirotkin ................ H04W 48/18
                                                       370/332
(Continued)

FOREIGN PATENT DOCUMENTS

CN      105144789 A    12/2015
CN      106233774 A    12/2016
(Continued)

OTHER PUBLICATIONS

International Search Report dated Aug. 15, 2018 from International Application No. PCT/CN2017/112942.
(Continued)

*Primary Examiner* — Lakeram Jangbahadur
(74) *Attorney, Agent, or Firm* — Young Basile Hanlon & MacFarlane, P.C.

(57) ABSTRACT

Provided are a method for accessing a wireless local area network, a terminal device and a network device, which are applied in a fifth-generation (5G) communication system using 5G mobile communication technologies. The method comprises: a terminal device receives first radio resource control (RRC) signaling sent by the network device, the first RRC signaling comprising first information that is determined by the network device and that is used for accessing a wireless local area network by the terminal device; and the terminal device accesses the wireless local area network according to the first information.

12 Claims, 3 Drawing Sheets

(51) Int. Cl.
*H04W 72/04* (2009.01)
*H04W 88/14* (2009.01)

(52) U.S. Cl.
CPC .......... *H04W 72/046* (2013.01); *H04W 76/11* (2018.02); *H04W 76/27* (2018.02); *H04W 88/14* (2013.01)

(58) Field of Classification Search
CPC ..... H04W 88/14; H04W 48/08; H04W 48/20; H04W 88/08; H04W 76/15; H04W 48/04; H04W 88/18; H04B 17/318
See application file for complete search history.

(56) References Cited

U.S. PATENT DOCUMENTS

| | | | | |
|---|---|---|---|---|
| 2015/0327139 | A1* | 11/2015 | Sirotkin | ............... H04W 76/27 370/332 |
| 2017/0055224 | A1* | 2/2017 | Boccardi | ............... H04W 28/08 |
| 2018/0041930 | A1* | 2/2018 | Hampel | ................ H04W 76/11 |
| 2018/0132143 | A1* | 5/2018 | Sirotkin | ................ H04W 84/12 |
| 2018/0220474 | A1* | 8/2018 | Laselva | ................ H04W 48/18 |
| 2019/0289528 | A1* | 9/2019 | Lou | ....................... H04W 76/27 |

FOREIGN PATENT DOCUMENTS

| | | |
|---|---|---|
| CN | 106465179 A | 2/2017 |
| WO | 2016164714 A1 | 10/2016 |
| WO | 2017172450 A1 | 10/2017 |

OTHER PUBLICATIONS

Extended European Seaerch Report for European Application No. 17932800.0 dated Aug. 31, 2020.
Korean Notification of Reason for Refusal with English Translation for KR Application 1020207017110 dated Aug. 30, 2021 (14 pages).

* cited by examiner

METHOD FOR ACCESSING WIRELESS LOCAL AREA NETWORK, TERMINAL DEVICE, AND NETWORK DEVICE

CROSS-REFERENCE TO RELATED APPLICATION(S)

This application is a 371 application of International Application No. PCT/CN2017/112942, filed on Nov. 24, 2017, the entire disclosure of which is hereby incorporated by reference.

TECHNICAL FIELD

Implementations of the present disclosure relate to a field of communication, and more particularly, relate to a method for accessing a wireless local area network, a terminal device and a network device.

BACKGROUND

The 3rd Generation Partnership Project (3GPP) began to introduce a solution of loose coupling interworking and tight coupling with Wireless LAN (WLAN) and technology of unauthorized access into a Long Term Evolution (LTE) system. New Radio (NR) of 5-Generation (5G) mobile communication technology also needs to support access to the unauthorized access technologies including WLAN, so that taking into account the Quality of service (QoS) requirement, some or all traffic may be transferred to WLAN or an unlicensed frequency band, thus saving a resource of a licensed frequency band of a cellular network.

However, due to incompatibility between LTE and 5G NR, the solution of loose coupling interworking and tight coupling and the technology of unauthorized access in the LTE system may not be simply applied to 5G NR.

At present, there is no specific solution for unauthorized access in 5G NR and access from RAN side to WLAN.

SUMMARY

A method for accessing a wireless local area network, a terminal device and a network device are provided. A WLAN of the terminal device is configured by enhancing a Radio Resource Control (RRC) signaling of 5G NR.

In a first aspect, a method of accessing a wireless local area network is provided, which is applied to a communication system of 5-Generation (5G) mobile communication technology. The method includes: receiving, by a terminal device, a first radio resource control (RRC) signaling sent by a network device, wherein the first RRC signaling includes first information, determined by the network device, for the terminal device to access the wireless local area network; and accessing, by the terminal device, the wireless local area network according to the first information.

With the method for accessing a wireless local area network of an implementation of the present disclosure, for the 5G communication system, part or all of traffic may be transferred to a WLAN or a unlicensed frequency band through enhancing an RRC signaling, thus saving a resource of a licensed frequency band.

In some possible implementations, the first information includes at least one piece of the following information: access point (AP) information in a cell where the terminal device is located, a parameter for the terminal device to determine whether to access the AP, and backhaul link capacity information of the AP.

Accessing, by the terminal device, the wireless local area network according to the first information, includes: determining, by the terminal device, the target AP according to the first information; accessing, by the terminal device, the wireless local area network through the target AP.

In some possible implementations, the AP information includes identification information of at least one AP available to the terminal device, and the AP information is information determined by the network device according to at least one piece of the following information: a sector where the terminal device is located, a beam possessed by the terminal device, Global Positioning System (GPS) information of the terminal device, and a path loss of the terminal device.

In some possible implementations, the identification information includes: a service set identifier (SSID) of the AP.

In some possible implementations, the parameter is information determined by the network device according to a signal quality measurement report of a specific access point (AP).

Before the terminal device receives the first radio resource control RRC signaling sent by the network device, the method further includes: receiving, by the terminal device, indication information sent by the network device, and the indication information is used for indicating the terminal device to measure a signal quality of the specific AP; sending, by the terminal device, the signal quality measurement report to the network device.

In some possible implementations, the indication information is more specifically used for indicating a transmission time of a beam possessed by the specific AP and/or a channel possessed by the specific AP.

In some possible implementations, the transmission time of the beam possessed by the specific AP and/or the channel possessed by the specific AP are information acquired by the network device through a logical interface between the network device and the specific AP.

In some possible implementations, the specific AP is an AP with a specific service set identifier (SSID).

In some possible implementations, the parameter includes a received signal strength indication (RSSI).

In some possible implementations, receiving, by the terminal device, the indication information sent by the network device, includes: receiving, by the terminal device, a second radio resource control (RRC) signaling sent by the network device, wherein the second RRC signaling includes the indication information.

In a second aspect, a method for accessing a wireless local area network is provided, which is applied to a communication system of 5-Generation (5G) mobile communication technology. The method includes: determining, by a network device, first information for a terminal device to access the wireless local area network; and sending, by the network device, a first radio resource control (RRC) signaling to the terminal device, wherein the first RRC signaling includes the first information so that the terminal device accesses the wireless local area network according to the first information.

In some possible implementations, the first information includes at least one piece of the following information: access point (AP) information of a cell where the terminal device is located, a parameter for the terminal device to determine whether to access the AP, and backhaul link capacity information of the AP.

In some possible implementations, the AP information includes identification information of at least one AP available to the terminal device.

Determining, by the network device, the first information for the terminal device to access the wireless local area network, includes: determining, by the network device, the AP information according to at least one piece of the following information: a sector where the terminal device is located, a beam possessed by the terminal device, GPS information of the terminal device, and a path loss of the terminal device.

In some possible implementations, the identification information includes a service set identifier (SSID) of the AP.

In some possible implementations, before the network device determines the first information for the terminal device to access the wireless local area network, the method further includes: sending, by the network device, indication information to the terminal device, wherein the indication information is used for indicating the terminal device to measure a signal quality of a specific access point (AP); and receiving, by the network device, a signal quality measurement report of the specific AP sent by the terminal device.

Determining, by the network device, the first information for the terminal device to access the wireless local area network, includes: determining, by the network device, the parameter according to the signal quality measurement report.

In some possible implementations, the indication information is more specifically used for indicating a transmission time of a beam possessed by the specific AP has and/or a channel possessed by the specific AP.

In some possible implementations, before the network device sends the indication information to the terminal device, the method further includes: acquiring, by the network device, the transmission time of the beam possessed by the specific AP and/or the channel possessed by the specific AP through a logical interface between the network device and the specific AP.

In some possible implementations, the specific AP is an AP with a specific service set identifier (SSID).

In some possible implementations, the parameter includes a received signal strength indication (RSSI).

In some possible implementations, sending, by the network device, the indication information to the terminal device, includes: sending, by the network device, a second radio resource control (RRC) signaling to the terminal device, wherein the second RRC signaling includes the indication information.

In a third aspect, a terminal device is provided, which is applied to a communication system of 5-Generation (5G) mobile communication technology. The terminal device includes: a transceiving unit, configured to receive a first radio resource control (RRC) signaling sent by a network device, wherein the first RRC signaling includes first information determined by the network device for the terminal device to access a wireless local area network; and a processing unit, configured to access the wireless local area network according to the first information.

In a fourth aspect, a terminal device is provided, which is applied to a communication system of 5-Generation (5G) mobile communication technology. The terminal device includes: a transceiver, configured to receive a first radio resource control (RRC) signaling sent by a network device, wherein the first RRC signaling includes first information determined by the network device for the terminal device to access a wireless local area network; and a processor, configured to access the wireless local area network according to the first information.

In a fifth aspect, a network device is provided, which is applied to a communication system of 5-Generation (5G) mobile communication technology. The network device includes: a processing unit, configured to determine first information for a terminal device to access a wireless local area network; a transceiving unit, configured to send a first radio resource control (RRC) signaling to the terminal device, wherein the first RRC signaling includes the first information, so that the terminal device accesses the wireless local area network according to the first information.

In a sixth aspect, a network device is provided, which is applied to a communication system of 5-Generation (5G) mobile communication technology. The network device includes: a processor, configured to determine first information for a terminal device to access a wireless local area network; and a transceiver, configured to send a first radio resource control (RRC) signaling to the terminal device, wherein the first RRC signaling includes the first information, so that the terminal device accesses the wireless local area network according to the first information.

In a seventh aspect, a computer readable medium is provided for storing a computer program. The computer program includes instructions used for executing the method implementations of the above first aspect or the second aspect.

In an eighth aspect, a computer chip is provided. The computer chip includes an input interface, an output interface, at least one processor, and a memory. The processor is used for executing codes in the memory. When the codes are executed, the processor may implement various processes performed by the network device in the method of accessing a wireless local area network in the above first aspect or the second aspect.

In a ninth aspect, a computer chip is provided. The computer chip includes: an input interface, an output interface, at least one processor, and a memory. The processor is used for executing code in the memory. When the code is executed, the processor may implement various processes performed by the terminal device in the method of accessing a wireless local area network in the above first aspect or the second aspect.

In a tenth aspect, a communication system is provided, including the above mentioned network device and the above mentioned terminal device.

DETAILED DESCRIPTION

Figure 1:
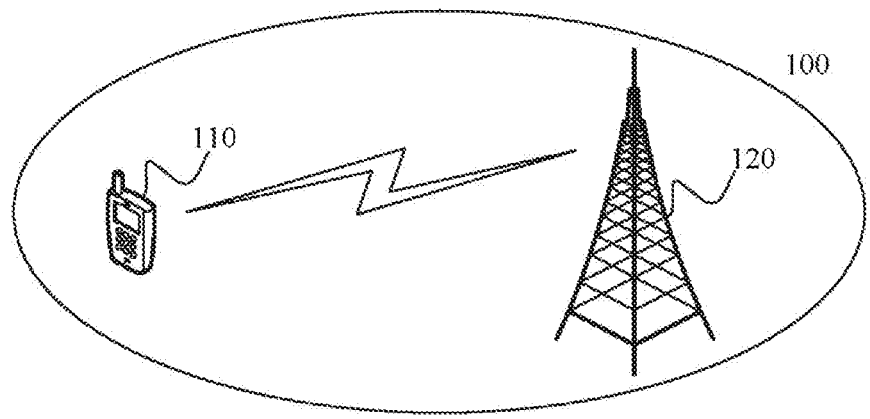
FIG. 1 is an example of an application scenario of the present disclosure.

FIG. 1 is a schematic diagram of an application scenario according to an implementation of the present disclosure.

As shown in FIG. 1, a communication system 100 may include a terminal device 110 and a network device 120. The network device 120 may communicate with the terminal device 110 via an air interface. Multi-service transmission is supported between the terminal device 110 and the network device 120.

It should be understood that the 5G communication system 100 is only an example for describing implementations of the present disclosure. However, implementations of the present disclosure are not limited to this. That is, technical solutions of implementations of the present disclosure may be applied to various scenarios including 5G communication system. For example, a 5G communication system and a first communication system constitute a hybrid deployment aggregation scenario, etc. The first communication system may be any communication system, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, LTE Time Division Duplex (TDD), a Universal Mobile Telecommunication System (UMTS), etc.

In addition, the present disclosure describes various implementations in connection with a network device and a terminal device.

The network device 120 may refer to any entity, on a network side, for sending or receiving signals, for example, a base station device in a 5G network, etc.

The terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. For example, the access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, or the like.

It should be understood that since LTE does not have compatibility with 5G NR, a scenario shown in FIG. 1 is not applicable to a solution of loose coupling interworking and tight coupling and an unauthorized access technology in an LTE system.

Therefore, an implementation of the present disclosure provides a method for accessing a wireless local area network, a terminal device and a network device. A WLAN of the terminal device is configured through enhancing a Radio Resource Control (RRC) signaling of 5G NR, so that the terminal device may discover a target Access Point (AP) and access the WLAN through the target AP.

Figure 2:
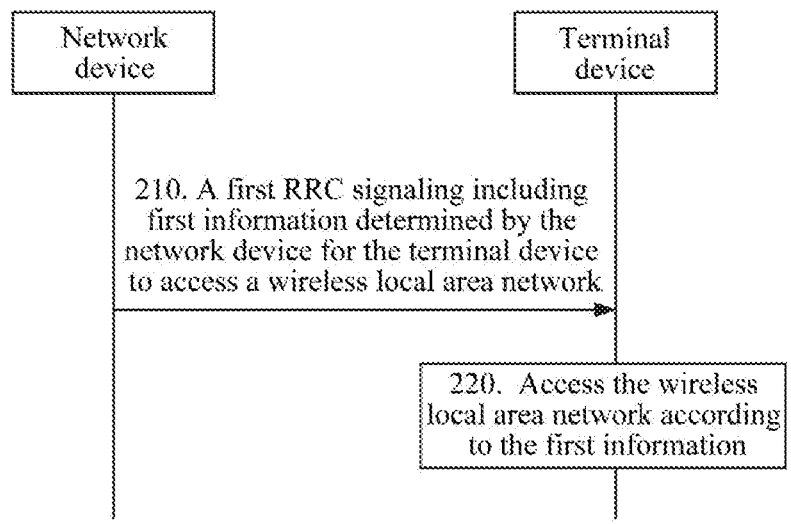
FIG. 2 is a schematic flow chart of a method for accessing a wireless local area network according to an implementation of the present disclosure.

FIG. 2 is a schematic flow chart of a method for accessing a wireless local area network according to an implementation of the present disclosure. It should be understood that methods of implementations of the present disclosure may be applied to a communication system of 5-Generation (5G) mobile communication technology.

Specifically, as shown in FIG. 2, the method 300 includes acts 210-220.

In 210, a network device sends a first RRC signaling to a terminal device, and the first RRC signaling includes first information, determined by the network device, for the terminal device to access a wireless local area network.

In 220, the terminal device accesses the wireless local area network according to the first information.

Specifically, for the network device, the network device determines the first information; the network device sends the first RRC signaling to the terminal device, and the first RRC signaling includes the first information so that the terminal device accesses the wireless local area network according to the first information. For the terminal device, the terminal device receives the first RRC signaling sent by the network device, and the first RRC signaling includes the first information, determined by the network device, for the terminal device to access the wireless local area network; and the terminal device accesses the wireless local area network according to the first information.

Optionally, the first information includes at least one piece of the following information: AP information in the cell where the terminal device is located, a parameter for the terminal device to determine whether to access the AP, and backhaul link capacity information of the AP.

For example, the AP information may include identification information of at least one AP available to the terminal device, and further, the identification information may include a Service Set Identifier (SSID) of the AP. For another example, the parameter includes a received signal strength indication (RSSI).

It should be understood that the above specific contents of the AP information and the parameter are only example descriptions, and implementations of the present disclosure are not specifically limited thereto.

Thus, the terminal device may determine a target AP according to the first information; furthermore, the terminal device accesses the wireless local area network through the target AP. That is, the network device configures a WLAN of the terminal device through enhancing a RRC signaling of 5G NR, so that the terminal device may discover the target AP and access the WLAN through the target AP.

In other words, in an implementation of the present disclosure, a 5G NR+WLAN terminal with WLAN offload requirement may acquire the first information for accessing the WLAN from the network device through the RRC signaling, discover and measure a WLAN system, and determine whether a WLAN network may be accessed. If so, the terminal establishes a data bearer to the network device or to the core network connected to the network device through the WLAN network, thus offloading a data flow on an air interface bearer of the network device to a WLAN interface, and saving a resource of a licensed frequency band.

In other words, the method for accessing a wireless local area network according to an implementation of the present disclosure may transfer part or all of traffic to a WLAN or an unlicensed frequency band for a 5G communication system, thus saving a resource of a licensed frequency band. For example, in consideration of the Quality of Service (QoS) requirement, some or all traffic are transferred to the WLAN or the unlicensed frequency band.

In addition, RRC is not limited to a capacity and good user experience is obtained.

The following is description of an implementation of determining AP information by a terminal device in an implementation of the present disclosure.

In one implementation, the AP information is information determined by the network device according to at least one piece of the following information: a sector where the terminal device is located, a beam possessed by the terminal device, Global Positioning System (GPS) information of the terminal device, and a path loss of the terminal device.

Specifically, the network device may provide more accurate and rich AP information for the terminal device according to location information (such as GPS) of the terminal device, in combination with the sector where the terminal device is located and the beam possessed by the terminal device. In an implementation of the present disclosure, the sector where the terminal device is located and the beam possessed by the terminal device may be understood as beam information. In an implementation of the present disclosure, the network device may obtain the beam information according to the beam through which the terminal device initiates random access or the beam through which data transmission is performed via a cellular network, but implementations of the present disclosure are not limited to this.

More specifically, the beam information is equivalent to dividing the coverage of a cell into multiple sectors, and in combination with the path loss of the terminal device, further dividing different areas within a sector.

Figure 3:
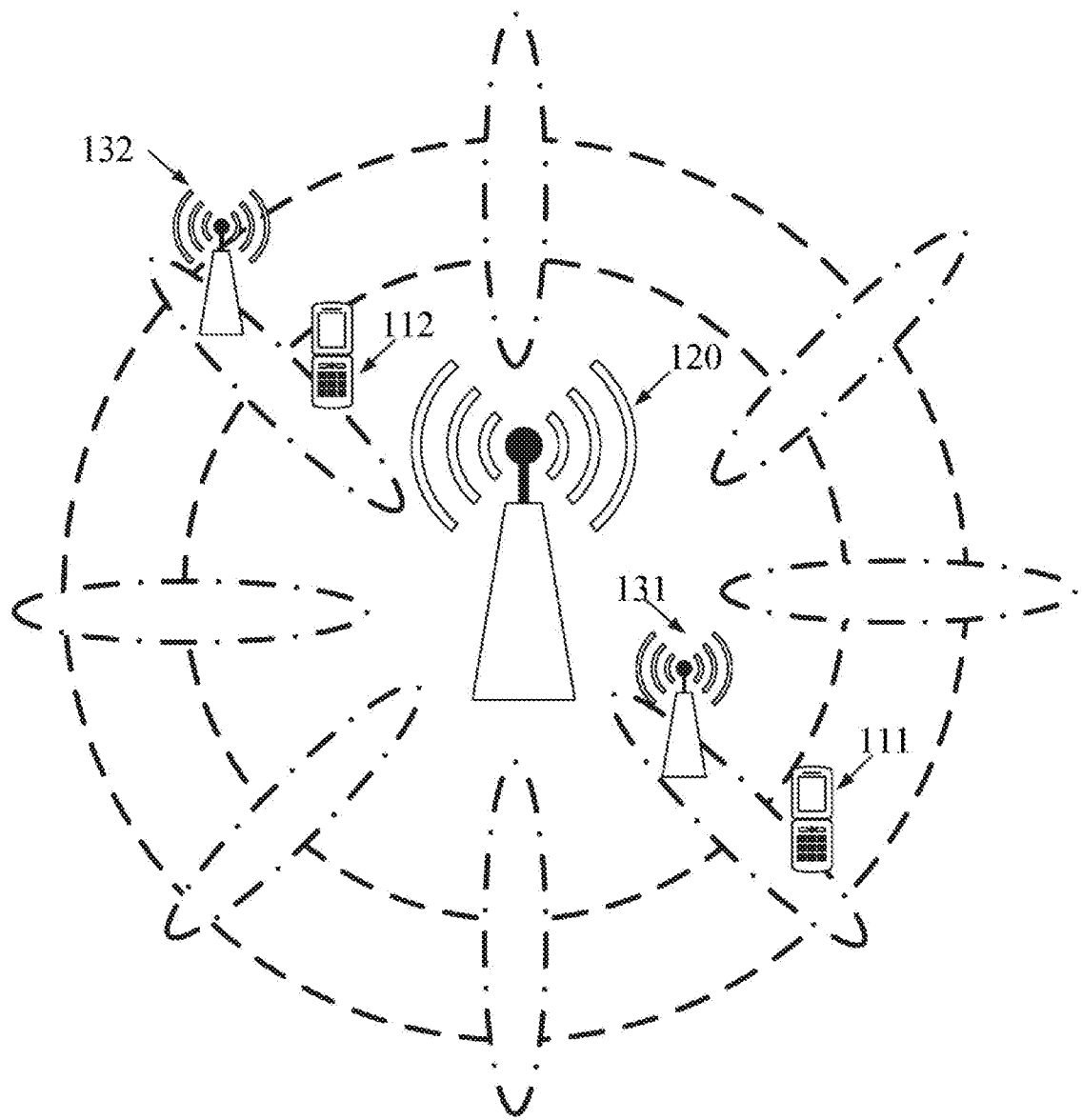
FIG. 3 is a schematic diagram of a location and a beam of an AP according to an implementation of the present disclosure.

For example, as shown in FIG. 3, a network device may determine from the above beam information that a terminal device 111 and an AP 131 are in one beam, and a terminal device 112 and an AP 132 are in the same beam. Thus, the network device determines that AP information of the terminal device 111 is an SSID of the AP 131, and the network device determines that AP information of the terminal device 112 is an SSID of the AP 132. That is, the network device provides more accurate and rich AP information for a terminal device.

It may be found that in the implementation of the present disclosure, information used by the network device to determine the AP information does not completely depend on GPS information, that is, the method of the implementation of the present disclosure is also suitable for an idle terminal device and an inactive terminal device.

The following is description of an implementation of determining the parameter by the terminal device in an implementation of the present disclosure.

In one implementation, the parameter is information determined by the network device according to a signal quality measurement report of a specific access point (AP).

Specifically, the terminal device may receive indication information sent by the network device before the terminal device receives the first RRC signaling (i.e., the first information in the implementation of the present disclosure) sent by the network device, and the indication information is used for indicating the terminal device to measure a signal quality of the specific AP; and the terminal device sends a signal quality measurement report to the network device.

In other words, the network device sends the indication information to the terminal device, and further, the network device receives the signal quality measurement report of the specific AP sent by the terminal device; and the parameter is determined according to the signal quality measurement report.

It should be understood that implementations of the present disclosure do not limit a form in which a specific AP is embodied.

For example, the indication information may be more specifically used for indicating a transmission time of the beam possessed by the specific AP. The transmission time of the beam possessed by the specific AP is information acquired by the network device through a logical interface between the network device and the specific AP. Therefore, a measurement of the specific AP by the terminal device may be made more efficiently in time and energy.

For another example, the indication information may be more specifically used for indicating a channel possessed by the specific AP. The channel possessed by the specific AP is information acquired by the network device through a logical interface between the network device and the specific AP. Therefore, an efficiency of a terminal in measuring the WLAN channel quality may be effectively improved.

For another example, the indication information may be more specifically used for indicating the transmission time of the beam possessed by the specific AP and/or the channel possessed by the specific AP. The transmission time of the beam possessed by the specific AP and/or the channel possessed by the specific AP are information acquired by the network device through a logical interface between the network device and the specific AP. Therefore, not only a measurement of the specific AP by the terminal device may be made more efficiently in time and energy, but also an efficiency of measuring the WLAN channel quality by the terminal may be effectively improved.

For another example, the specific AP is an AP having a specific service set identifier (SSID) determined by the network device.

It should be noted that the specific AP in an implementation of the present disclosure may be directly determined by the network device.

Optionally, receiving, by the terminal device, the indication information sent by the network device includes: the terminal device receives a second RRC signaling sent by the network device, and the second RRC signaling includes the indication information.

Figure 4:
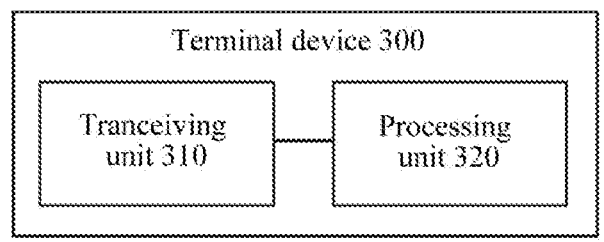
FIG. 4 is a schematic block diagram of a terminal device according to an implementation of the present disclosure.

FIG. 4 is a schematic block diagram of a terminal device according to an implementation of the present disclosure.

As shown in FIG. 4, the terminal device 300 includes a transceiving unit 310 and a processing unit 320.

The transceiving unit 310 is configured to receive a first radio resource control (RRC) signaling sent by a network device, wherein the first RRC signaling includes first information, determined by the network device, for the terminal device to access a wireless local area network.

The processing unit 320 is configured to access the wireless local area network according to the first information.

Optionally, the first information includes at least one piece of the following information: access point (AP) information in a cell where the terminal device is located, a parameter for the terminal device to determine whether to access the AP, and backhaul link capacity information of the AP.

The processing unit 320 is specifically configured to: determine a target AP according to the first information; and access the wireless local area network through the target AP.

Optionally, the AP information includes identification information of at least one AP available to the terminal device, and the AP information is information determined by the network device according to at least one piece of the following information: a sector where the terminal device is located, a beam possessed by the terminal device, GPS information of the terminal device and a path loss of the terminal device.

Optionally, the identification information includes: a service set identifier (SSID) of the AP.

Optionally, the parameter is information determined by the network device according to a signal quality measurement report of a specific access point (AP).

The transceiving unit 310 is further configured to: receive indication information sent by the network device before receiving the first RRC signaling sent by the network device, wherein the indication information is used for indicating the terminal device to measure a signal quality of the specific AP; and send the signal quality measurement report to the network device.

Optionally, the indication information is more specifically used for indicating a transmission time of the beam possessed by the specific AP and/or a channel possessed by the specific AP.

Optionally, the transmission time of the beam possessed by the specific AP and/or the channel possessed by the specific AP are information acquired by the network device through a logical interface between the network device and the specific AP.

Optionally, the specific AP is an AP with a specific service set identifier (SSID).

Optionally, the parameter includes a received signal strength indication (RSSI).

Optionally, the transceiver unit 310 is more specifically configured to: receive a second radio resource control (RRC) signaling sent by the network device, wherein the second RRC signaling includes the indication information.

Figure 5:
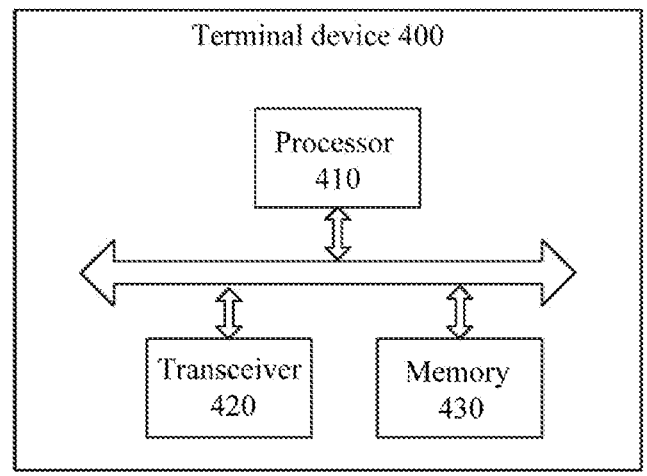
FIG. 5 is a schematic block diagram of another terminal device according to an implementation of the present disclosure.

It should be noted that in an implementation of the present disclosure, the transceiving unit 310 may be implemented by a transceiver, and the processing unit 320 may be implemented by a processor. As shown in FIG. 5, a terminal device 400 may include a processor 410, a transceiver 420, and a memory 430. The memory 430 may be used for storing indication information, or may be used for storing codes, instructions and the like executed by the processor 410. The various components in the terminal device 400 are connected by a bus system. The bus system includes a power bus, a control bus and a status signal bus in addition to a data bus.

The terminal device 400 shown in FIG. 5 may implement the various processes implemented by the terminal device in the method implementation of FIG. 2 described above. In order to avoid duplication, the details will not be repeated here.

Figure 6:
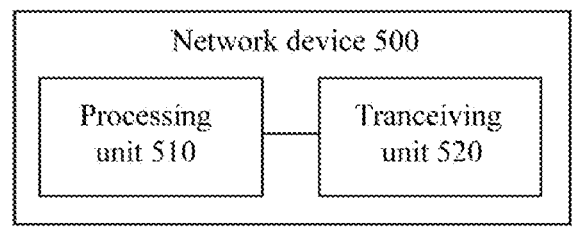
FIG. 6 is a schematic block diagram of a network device according to an implementation of the present disclosure.

FIG. 6 is a schematic block diagram of a network device according to an implementation of the present disclosure.

As shown in FIG. 6, the terminal device 500 includes a processing unit 510 and a transceiving unit 520.

The processing unit 510 is configured to determine first information for the terminal device to access a wireless local area network.

The transceiving unit 520 is configured to send a first radio resource control (RRC) signaling to the terminal device, wherein the first RRC signaling includes the first information so that the terminal device may access the wireless local area network according to the first information.

Optionally, the first information includes at least one piece of the following information: access point (AP) information in a cell where the terminal device is located, a parameter for the terminal device to determine whether to access the AP, and backhaul link capacity information of the AP.

Optionally, the AP information includes identification information of at least one AP available to the terminal device.

The processing unit 510 is specifically configured to: determine the AP information according to at least one piece of the following information: a sector where the terminal device is located, a beam possessed by the terminal device, GPS information of the terminal device, and a path loss of the terminal device.

Optionally, the identification information includes: a service set identifier (SSID) of the AP.

Optionally, the transceiving unit 520 is further configured to: send indication information to the terminal device before the processing unit 510 determines the first information, wherein the indication information is used for indicating the terminal device to measure a signal quality of a specific access point AP; and receive a signal quality measurement report of the specific AP sent by the terminal device.

The processing unit 510 is specifically configured tor: determine the parameter according to the signal quality measurement report.

Optionally, the indication information is more specifically used for indicating the transmission time of the beam possessed by the specific AP and/or the channel possessed by the specific AP.

Optionally, the processing unit 510 is further configured to: obtain the transmission time of the beam possessed by the specific AP and/or the channel possessed by the specific AP through a logical interface between the network device and the specific AP before the transceiving unit 520 sends the indication information to the terminal device.

Optionally, the specific AP is an AP with a specific service set identifier (SSID).

Optionally, the parameter includes a received signal strength indication (RSSI).

Optionally, the transceiving unit 520 is more specifically configured to: send a second radio resource control (RRC) signaling to the terminal device, wherein the second RRC signaling includes the indication information.

Figure 7:
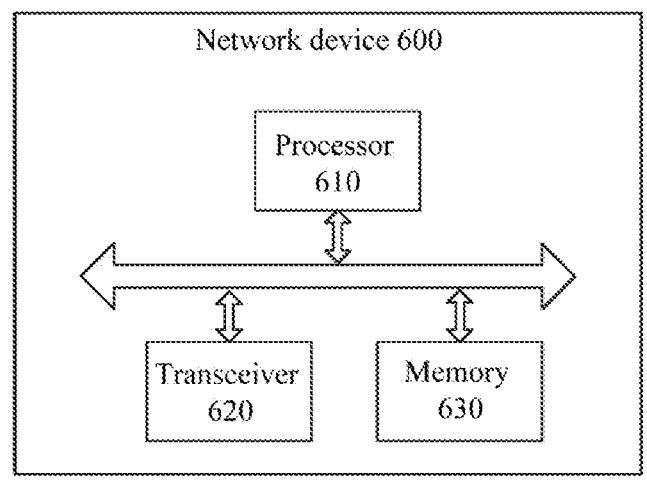
FIG. 7 is a schematic block diagram of another network device according to an implementation of the present disclosure.

It should be noted that the processing unit 510 may be implemented by a processor, and the transceiver unit 520 may be implemented by a transceiver. As shown in FIG. 7, a network device 600 may include a processor 610, a transceiver 620, and a memory 630. The memory 630 may be used for storing indication information, or may be used for storing codes, instructions, and the like executed by the processor 610. The various components in the network device 600 are connected by a bus system. The bus system includes a power bus, a control bus and a status signal bus in addition to a data bus.

The network device 600 shown in FIG. 7 may implement the various processes implemented by the network device in the method implementation of FIG. 2 described above. In order to avoid duplication, the details will not be repeated here.

It should be noted that the method implementations in implementations of the present disclosure may be applied to a processor or implemented by a processor.

In the implementation process, various acts of the method implementations in the implementations of the present disclosure may be completed by an integrated logic circuit of hardware in the processor or an instruction in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the acts of the above method in combination with its hardware.

Herein, the processor may be an integrated circuit chip with a capability for processing signals, and may implement various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic equipment, a transistor logic equipment, or a discrete hardware component, or the like. Furthermore, the general purpose processor may be a microprocessor or the processor may be any conventional processor or the like.

In addition, the storage in implementations of the present disclosure may be a transitory memory or non-transitory memory, or may include both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. It should be understood that, the foregoing memory is an example for illustration and should not be construed as limiting. For example, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a", "said", and "the" used in the implementations of the present disclosure and the appended claims are also intended to include the plural forms unless the context clearly indicates other meanings.

For another example, depending on the context, the word "when" as used herein may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that the example elements and algorithm acts described in combination with the implementations disclosed herein can be implemented in electronic hardware, or a combination of computer software and electronic hardware. Whether these functions are implemented in hardware or software depends on the specific application and design constraints of the technical solution. One skilled in the art may use different methods to implement the described functions for each particular application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the method implementations and will not be described here.

In several implementations provided by the present disclosure, it should be understood that the disclosed systems, apparatuses and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be in electrical, mechanical or other forms.

The unit described as a separate component may or may not be physically separated, and the component shown as a unit may or may not be a physical unit, i.e., it may be located in one place or may be distributed over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in implementations of the present disclosure. The aforementioned storage medium includes a medium capable of storing program codes, such as, a U disk, a mobile hard disk, a read-only memory (ROM), a random access memory (RAM), a magnetic disk or an optical disk, etc.

What are described above are merely the specific implementations of the implementations of the present disclosure, but the protection scope of the implementations of the present disclosure is not limited thereto. Any change or substitute that can be easily conceived by a person skilled in the art within the technical scope disclosed by the implementations of the present disclosure shall be included within the protection scope of the implementations of the present disclosure. Therefore, the protection scope of the implementations of the present disclosure should be subject to the protection scope of the claims.

What is claimed is:

1. A method for accessing a wireless local area network, applied to a communication system of 5-Generation (5G) mobile communication technology, comprising:
   determining, by a network device, first information for a terminal device to access the wireless local area network; and
   sending, by the network device, a first radio resource control (RRC) signaling to the terminal device, wherein the first RRC signaling comprises the first information, to enable the terminal device to access the wireless local area network according to the first information, wherein the first information comprises at least one piece of following information: access point (AP) information in a cell where the terminal device is located, a parameter for the terminal device to determine whether to access the AP, or backhaul link capacity information of the AP;

wherein before the network device determines the first information for the terminal device to access the wireless local area network, the method further comprises:

sending, by the network device, indication information to the terminal device, wherein the indication information is used for indicating the terminal device to measure a signal quality of a specific access point (AP) and for indicating a transmission time of at least one of a beam possessed by the specific AP or a channel possessed by the specific AP; and receiving, by the network device, a signal quality measurement report of the specific AP sent by the terminal device;

wherein determining, by the network device, the first information for the terminal device to access the wireless local area network, comprises:

determining, by the network device, the parameter according to the signal quality measurement report;

wherein before the network device sends the indication information to the terminal device, the method further comprises:

acquiring, by the network device, the transmission time of the at least one of the beam possessed by the specific AP or the channel possessed by the specific AP through a logical interface between the network device and the specific AP.

2. The method of claim 1, wherein the AP information comprises identification information of at least one AP available to the terminal device;

wherein, determining, by the network device, the first information for the terminal device to access the wireless local area network, comprises:

determining, by the network device, the AP information according to at least one piece of following information; and a sector where the terminal device is located, a beam possessed by the terminal device, Global Positioning System (GPS) information of the terminal device, and a path loss of the terminal device.

3. The method of claim 2, wherein the identification information comprises: a service set identifier (SSID) of the AP.

4. The method of claim 1, wherein the specific AP is an AP having a specific service set identifier (SSID).

5. The method of claim 1, wherein the parameter comprises: a received signal strength indication (RSSI).

6. The method of claim 1, wherein sending, by the network device, the indication information to the terminal device, comprises:

sending, by the network device, a second radio resource control (RRC) signaling to the terminal device, wherein the second RRC signaling comprises the indication information.

7. A terminal device, applied to a communication system of 5-Generation (5G) mobile communication technology, comprising:

a transceiver, configured to receive a first radio resource control (RRC) signaling sent by a network device, wherein the first RRC signaling comprises first information, determined by the network device, for the terminal device to access a wireless local area network; and a processor, configured to access the wireless local area network according to the first information;

wherein the first information comprises at least one piece of following information: access point (AP) information in a cell where the terminal device is located, a parameter for the terminal device to determine whether to access the AP, or backhaul link capacity information of the AP, wherein the processor is further configured to determine a target AP according to the first information, and access the wireless local area network through the target AP, wherein the parameter is information determined by the network device according to a signal quality measurement report of a specific access point (AP);

wherein the transceiver is further configured to receive indication information sent by the network device before receiving the first RRC signaling sent by the network device;

wherein the indication information is used for indicating the terminal device to measure a signal quality of the specific AP, sending the signal quality measurement report to the network device, and indicating a transmission time of at least one of a beam possessed by the specific AP or a channel possessed by the specific AP;

wherein the transmission time of the at least one of the beam possessed by the specific AP or the channel possessed by the specific AP are information acquired by the network device through a logical interface between the network device and the specific AP.

8. The terminal device of claim 7, wherein the AP information comprises identification information of at least one AP available to the terminal device, and the AP information is information determined by the network device according to at least one piece of following information:

a sector where the terminal device is located, a beam possessed by the terminal device, Global Positioning System (GPS) information of the terminal device, or a path loss of the terminal device.

9. The terminal device of claim 8, wherein the identification information comprises: a service set identifier (SSID) of the AP.

10. The terminal device of claim 7, wherein the specific AP is an AP having a specific service set identifier (SSID).

11. The terminal device of claim 7, wherein the parameter comprises a received signal strength indication (RSSI).

12. The terminal device of claim 7, wherein the transceiver is further configured to:

receive a second radio resource control (RRC) signaling sent by the network device, wherein the second RRC signaling comprises the indication information.

* * * * *